United States Patent [19]
Bryson, III et al.

[11] Patent Number: 5,105,932
[45] Date of Patent: Apr. 21, 1992

[54] LINEAR AND ROTARY POSITIONING DEVICE

[76] Inventors: Charles E. Bryson, III, 1072 Tanland Dr. #112, Palo Alto, Calif. 94303; David C. Blakely, 1477 San Marcos Cir., Mountain View, Calif. 94043

[21] Appl. No.: 491,113
[22] Filed: Mar. 9, 1990
[51] Int. Cl.⁵ .............................. B65G 35/00
[52] U.S. Cl. ...................... 198/619; 414/3; 414/749
[58] Field of Search ............. 198/619; 414/3, 749, 414/8, 751, 752, 753

[56] References Cited

U.S. PATENT DOCUMENTS

| | | | |
|---|---|---|---|
| 2,996,330 | 8/1961 | Hutto | 414/8 X |
| 3,812,981 | 5/1974 | Potter | 414/749 |
| 4,768,911 | 9/1988 | Balter | 414/3 |
| 4,850,779 | 7/1989 | Cashell et al. | 414/3 |
| 4,893,980 | 1/1990 | Balter | 414/3 |

FOREIGN PATENT DOCUMENTS 33095  2/1985  Japan ...................... 414/8
103848  4/1989  Japan ...................... 414/749

*Primary Examiner*—Robert P. Olszewski
*Assistant Examiner*—Cheryl L. Gastineau
*Attorney, Agent, or Firm*—Michael L. Harrison

[57] ABSTRACT

A precision magnetic manipulator for use in positioning targets, and the like, within a vacuum chamber, employs separate mechanisms for linear and rotational motion and makes them substantially independent. Ball or roller style bearings support a square, linear shaft within a housing, at least one set of bearings being at the point at which the shaft exits the housing, and another set being within the housing along the route of travel of the linear shaft, so that the shaft is fully being supported over the entire travel length. A magnet carriage supporting high-strength magnets, one system being optimized for rotational motion and the other being optimized for linear motion, couples to magnet followers within the housing, thereby providing rotational motion and linear motion which can be used in combination or separately, giving great freedom of movement within the vacuum chamber.

1 Claim, 4 Drawing Sheets

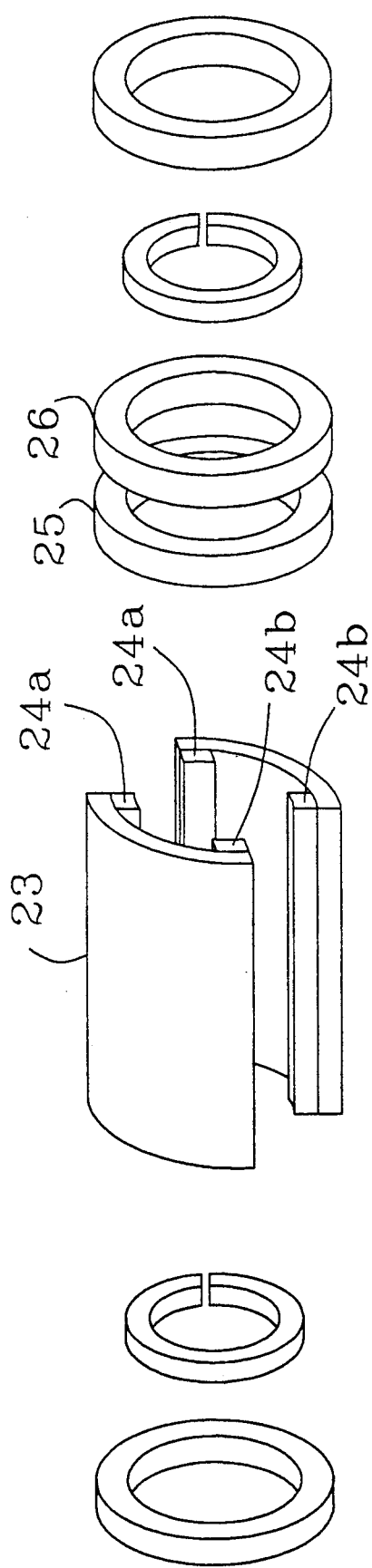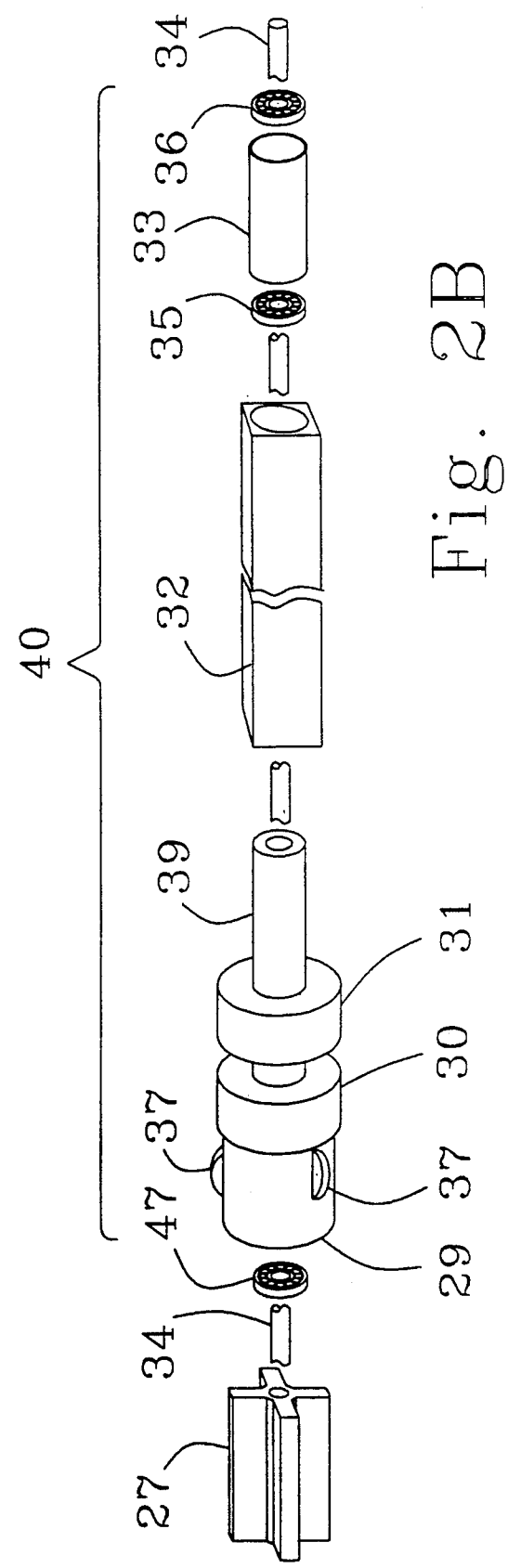

LINEAR AND ROTARY POSITIONING DEVICE

BACKGROUND OF THE INVENTION

1. Field of the Invention

The present invention relates to mechanical positioning devices and, in particular, to mechanical positioning devices for positioning a workpiece in a work space, which devices are operable from a position which is remote to a work space which may be enclosed from or inaccessible to the remote position.

2. Prior Art

In numerous industrial processes, scientific research and instrumentation applications it is necessary to introduce into, or to move specimens or work-in-process, within a controlled atmosphere which is maintained inside a chamber. In many processes the controlled atmosphere is frequently at reduced atmospheric pressure, ranging from partial atmospheres to hard vacuums. The materials to be treated in such processes are placed in a vacuum chamber in which there are various source materials available for such processes as plasma etching, sputtering, ion implantation, chemical vapor deposition, and similar processes.

In research instrumentation applications, the vacuum environment may be the interior of, for example, an electron microscope, a mass spectrometer, or the like.

Where the process requires materials to be introduced into or removed from a target area within a chamber, it is necessary either that the chamber have an access port which can be readily opened for movement of the materials, or some means of manipulating the material within the chamber from the exterior of the chamber. Other difficulties such as contamination aside, if the chamber must be opened to the surrounding atmosphere each time that a specimen is moved to a different position, the overall process time is increased to unacceptable levels. It is a time consuming and energy-wasting process to allow the interior of the chamber to stabilize to ambient pressure, and then to re-establish the level of pressure which is necessary for the continuation of the process, each time that material is introduced into or taken out of the chamber.

Furthermore, the intrusion of ambient atmosphere into the controlled atmosphere of the process apparatus or instrument which causes the introduction of contaminants or a change in the pressure cannot be ignored. While in some applications it is merely desirable to maintain the vacuum or atmosphere of the process apparatus, or the interior of the scientific instrument, free from intrusion of impurities in the ambient atmosphere into the interior of the apparatus, for some applications, of course, a high vacuum environment is fundamental to operations and maintaining the vacuum at all times is an overriding requirement.

As a practical matter, these considerations dictate that for almost all vacuum processes the vacuum must be maintained throughout the process. To avoid this time and energy wastage, the process apparatuses and instruments are almost invariably equipped with some form of transport device which allows movement of materials from one position to another in the chamber without necessitating the breaking of the chamber seal.

Devices used for sample transferring and positioning and similar functions within the vacuum chamber ideally will have maximum flexibility of movement. Changing from one sputtering target to another, for example, can require a combination of both linear and rotary motions. By providing for sufficiently flexible mechanical movement inside the vacuum chamber, operable from outside of the chamber, the need to break the vacuum and release it to atmospheric pressure is reduced. Generally for those chambers equipped with a flexible mechanical manipulator, only one pumpdown of the vacuum chamber will be required for a given process, if the mechanical motion is well-planned, and if all needed facilities are provided inside the vacuum chamber.

In the past, various forms of mechanical manipulators have been proposed for the solution to providing high vacuum deposition chambers, and the like, with satisfactory mechanical positioning devices. These solutions have taken the form of several separate classes of devices such as:

a) Rack and pinion mechanisms. These devices provide reliable linear motion, but have limited rotary motion.

b) Bellows Assemblies. This solution provides linear or rotary motion, but bellows are expensive, can fail, and require extremely strong structural supports to withstand atmospheric pressure, thereby obscuring desired tactile feedback.

c) Conventional Magnetically Operated Manipulators. These devices use a single shaft to provide translation and rotation with one coupled motion—the shaft moves in and out and rotates. This linkage between rotary and linear movements, however, severely limits motion flexibility.

Conventional magnetically operated manipulators employ a cylindrical housing attached to the side of the chamber, and protruding radially from the side of the chamber, within which is located a moveable rod.

In general, to accomplish the movement of the rod from a position outside of, e.g., a vacuum chamber, a magnet carriage slides over the exterior of a cylindrical housing, couples a magnetic field through the housing to a magnet follower which runs inside the housing and is attached to the manipulator rod. If the magnetic field is coupled to the follower asymmetrically, so that a field vector perpendicular to both the translational and the rotational direction is produced, then it is possible to exert both rotational and translational forces on the magnet follower, and therefore on the rod which is coupled to the magnet follower.

While the principles of operation stated above are straightforward, the successful implementation of the principles have posed problems of design which have heretofore not been satisfactorily solved.

As noted above, in the past, a single rod has been used for the purpose of providing both translation and rotation. In order to allow both translational and rotational movement of the rods, the rod had to be mounted in, typically, sleeve-type bearings, or slidable roller bearings such as Thompson linear bearings ®. These bearings allow both rotational and translational movement, but at the expense of much higher stiction and friction than ball or roller bearings used in an optimized configuration will allow. This is particularly true when the bearing is used inside a chamber in which the bearing must be operated in a dry condition. A particularly severe limitation of bearings which must support both linear and rotary motion is that the bearing may be easily cross-loaded, rendering it either temporarily inoperative due to mechanical binding or, in the worst case destroy the bearing or rod. Cross-loading is particularly likely when high loads are placed on the bearing, as when moderate to heavy loads are supported at the maximum extension of the manipulator rod.

Many prior art conventional magnetic manipulators also have had relatively low coupling forces between their external magnets and internal followers due to the absence of optimized magnets and design. This results in a highly elastic coupling, which in turn results in the position of the actuators does not corresponding to the position of the manipulators. This inherent sloppiness limits the precision with which motion can be transmitted by such manipulators, and, in turn, limits their usefulness in many situations.

The problems inherent in the designs of earlier precision magnetic manipulators have been primarily this lack of precision and the lack of good tactile feedback as a result of the stiction and friction forces which occur in the housing. The forces which produce good tactile feedback, essentially the transmission of the forces experienced by the movement of the manipulator under its load are obscured by the forces produced by the manipulator itself due to its inherent stiction and friction.

These problems have lead to the widespread disenchantment with precision magnetic manipulators of the older designs, and gradual movement toward different types of manipulators altogether.

SUMMARY OF THE INVENTION

Accordingly, a need has long existed, and presently exists, for a precision magnetic manipulator which overcomes the limitations of previously known manipulator designs. It is an object of the present invention to provide a precision magnet manipulator which can transmit linear and rotational movements independently of one another.

It is an object of the present invention to provide a precision magnetic manipulator which can handle greater axial force and torque and which exhibits better compliance and load carrying capability than traditional manipulators.

It is a further object of the present invention to provide a precision magnetic manipulator having low stiction and low backlash.

It is a further object of the present invention to provide a precision magnetic manipulator having improved tactile feedback.

The present invention accomplishes these and other objects by providing a manipulator which separates the mechanisms for linear and rotational motion and makes them independent. A round, rotating shaft is contained within a square, linear motion shaft. The round shaft rotates independently of the linear position of the linear shaft. Separate rotational ball or roller bearings support the rotating shaft within the linear shaft.

Ball or roller style bearings also support the square, linear shaft within the housing, with at least one set of bearings being located at the point at which the shaft exits the housing, and another set being located within the housing, along the route of travel of the linear shaft so that the shaft is fully supported over the entire length of its travel.

A magnet carriage which is slidably mounted on the exterior of the housing, supports high-strength magnet systems, one system optimized for rotational motion and the other optimized for linear motion, which magnets are coupled to magnet followers within the housing. Thereby rotational motion and linear motion can be used in combination or separately, giving great freedom of movement in terms of the position of the manipulator arm, and allowing both movements to be independently supported by bearings which are optimized to the specific purpose.

DESCRIPTION OF THE DRAWINGS

FIG. 2A is a detailed view of the exterior parts of the precision magnetic manipulator in accordance with the present invention.

FIG. 2B is a detailed view of the interior parts of the precision magnetic manipulator, which parts are located within the housing.

DESCRIPTION OF THE PREFERRED EMBODIMENT

Figure 1:
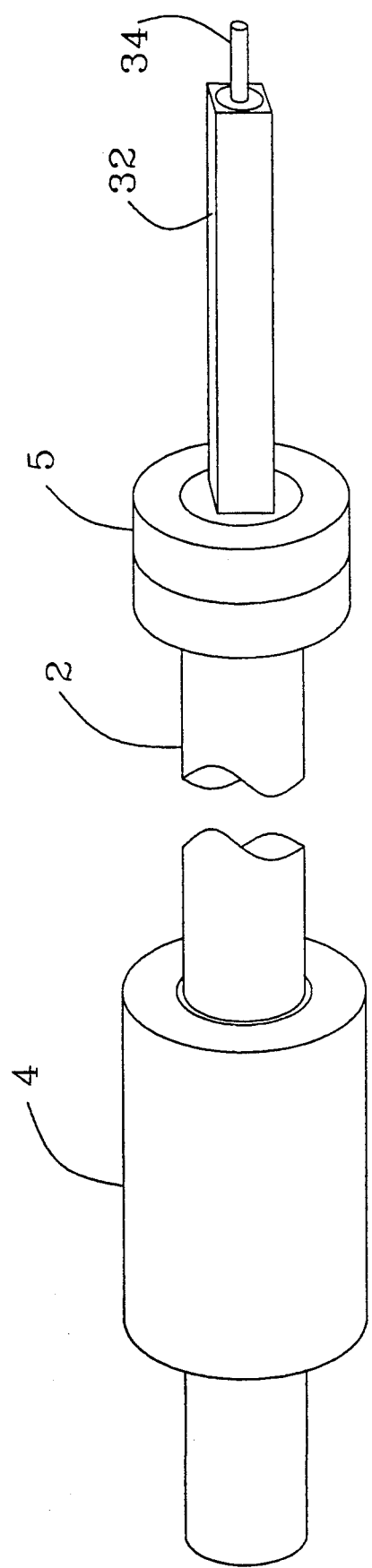
FIG. 1 is an overall view of a precision magnetic manipulator in accordance with the present invention showing in overall view the housing, the magnet carriage, and the end of the manipulator rod.

Referring now to FIG. 1, there is shown an overall view of the precision magnetic manipulator 1 in accordance with the present invention. For ease and clarity of discussion, it will be assumed in the following discussion that the manipulator is mounted to a conventional vacuum chamber. It will be apparent however, that the principle of operation and the design of the manipulator is applicable to all similar apparatuses and to any application in which remote manipulators are required. Since the housing is itself sealed, open only at the flange end for communication with the vacuum chamber, the entirety of the manipulator apparatus with the housing is within the vacuum chamber proper.

As shown in FIG. 1, the manipulator is comprised of a cylindrical housing 2 having a flange 5 for affixation to, preferably, a CFF ® flange. The flange is used to adapt the manipulator 1 to mounting on the side of, e.g., a vacuum chamber. In FIG. 1, all of the portion of the manipulator shown to the right of the right-most edge of the flange 5 and inside of the housing 2 would be located in the vacuum envelope. Parts protruding beyond the flange and into the vacuum chamber proper are the linear translation shaft 32 and the rotation shaft 34.

A magnet carriage 4 is slidably mounted to the exterior of the housing 2 and couples lines of magnetic force through the housing 2 to a magnetic follower not shown in FIG. 1. The magnet carriage 4 is free to move in translation along the length of the housing, and in rotation around the circumference of the housing.

The housing 2 is preferably constructed of a metal alloy which is transparent to magnetic fields, such as one of the nonmagnetic alloys of stainless steel.

Referring now to FIG. 2B there are shown the interior parts of the precision magnetic manipulator 1. In particular are shown, in exploded and broken line fashion, the center rod 34 and the linear translation shaft 32. At the operator end of the shaft 32 and backbone shaft 39 are located a bearing support 29 in which are mounted at least three roller bearings 37 which protrude beyond the surface of the bearing support 29 and contact the housing.

Figure 5:
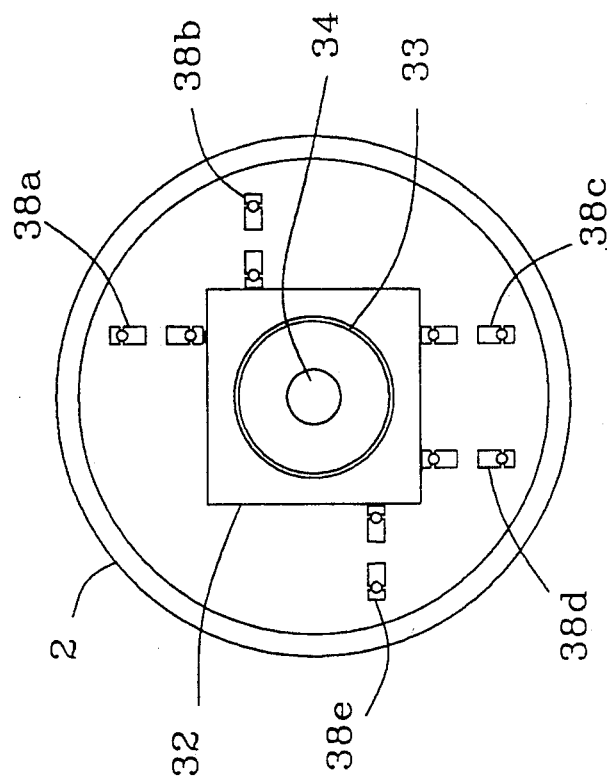
FIG. 5 is a cross-sectional end view of a precision magnetic manipulator in accordance with the present invention, taken from the chamber end of the apparatus, showing the arrangement of the bearings which support the linear motion shaft.

The bearing support housing 29 is of slightly smaller diameter than the inside diameter of the housing 2 and the roller bearings 37 are mounted at such a depth that they are maintaining contact with the inside surface of housing 2. In the vicinity of the flange 5 are located five bearings 38a, 38b, 38c, 38d, and 38e in FIG. 3, which are disposed around the periphery of the housing and are in contact with the four surfaces of the square translation shaft 32, as shown in FIG. 5. Bearings 38a and 38b, and bearings 38d and 38e are orthogonally arranged pairs which engage the corners of the square shaft 32. Preferably one or more of the bearings will be spring loaded toward the center of the shaft in order to improve precision. Thus the square translation shaft 32, which is engaged by means of the backbone shaft 39 to the bearing support housing 29, is free to move through the length of the housing 2, supported at both points of contact with the housing by ball or roller bearings for minimal stiction and friction. It will be appreciated that, although a square shaft is depicted in the drawing and used in the discussion, the geometry of the shaft is not fixed. Any means by which the linear shaft is prevented from rotating with respect to the rotating shaft will suffice.

The square translation shaft 32 and the backbone shaft 39 are coupled together to the bearing support housing 29 and, after assemblage, form a solid linear assembly 40.

It will be appreciated that the magnetic circuit elements of both followers may be interchanged, with the followers replacing the magnets and vice versa. The followers may themselves be magnets as well. However, due to vacuum chamber compatibility consideration, certain materials may be preferred over others, and generally it is better to place the magnets outside of the vacuum envelope.

Running the entire length of the linear shaft assembly 40 and protruding from both ends of that assembly, is the rotation shaft 34. Rotation shaft 34 is mounted in ball or roller bearings at both the chamber end (to the right in the drawing) and the magnet carriage end (to the left in the drawing) by bearings 35 and 36 mounted in support 33, and bearing 47, which are preferably ball or roller bearings for minimal friction and stiction in rotation motion.

To allow independence of linear and rotary motion, two independent magnet structures are used, one optimal for linear and one optimal for rotation motion. Both magnet structures, which are visible in FIGS. 2A, 2B, and 3, have an armature or follower and a magnet. First considering the rotary motion system in the figures, there is shown the system for rotary motion, comprising a rotary armature 27, a cruciform shape having equal-length arms, the overall diameter which is just slightly smaller than the inside diameter of the housing 2, and its associated magnets 24a and 24b and pole pieces 23.

Figure 4:
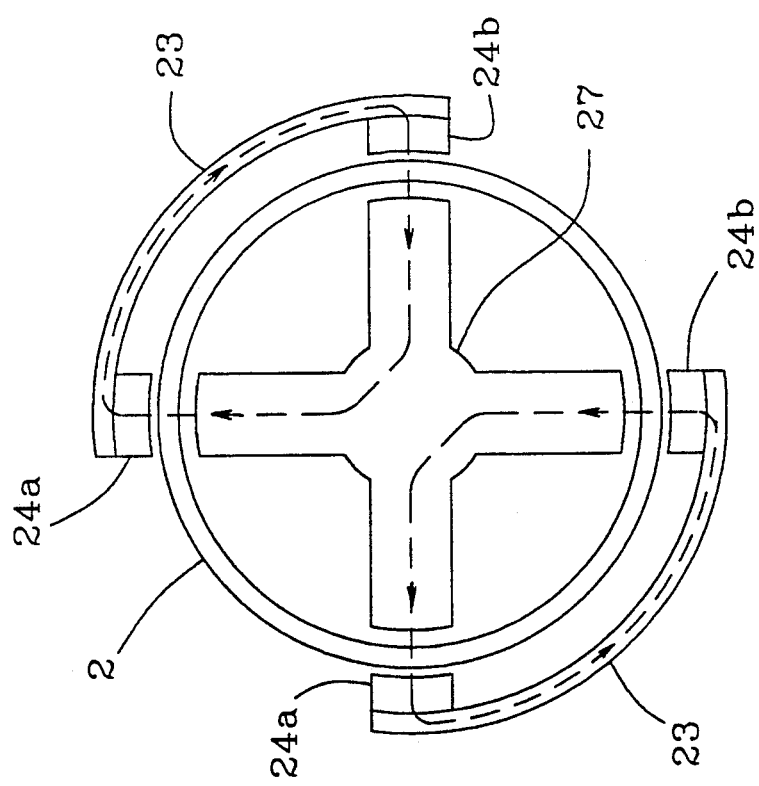
FIG. 4 is a cross-sectional end view of a precision magnetic manipulator in accordance with the present invention, taken from the actuator end of the apparatus, showing the arrangement of the magnetic circuit of the rotational magnet system.

The first magnet system is shown in more detail in cross-section in FIG. 4. In the figure, the dotted lines indicate the direction and path of the magnetic lines of force in the assembly. It may be noted that the fields of the magnets are additive, with magnets 24a and 24b oriented such that their fields aid rather than oppose one another in the magnetic circuit.

Figure 3:
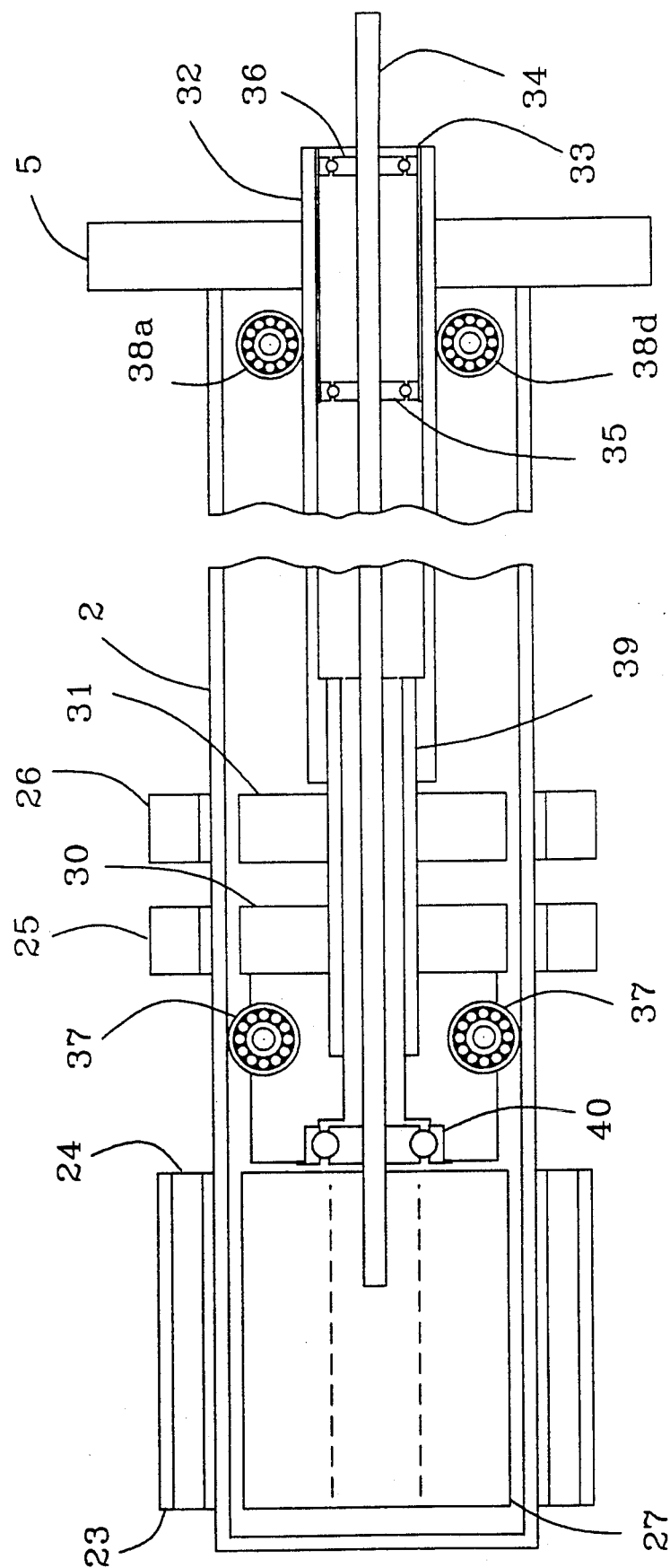
FIG. 3 is a cross-sectional view of the precision magnetic manipulator in accordance with the present invention showing the physical arrangement of the interior parts of FIG. 2B, the exterior parts of FIG. 2A, and the housing of FIG. 1.

A second magnet system, visible in FIG. 3 comprises a magnetic circuit for coupling motion from the magnet carriage 4 to the linear assembly 40. The magnet system is comprised of ring magnets 25 and 26 and ring magnet followers 30 and 31. The fields of the ring magnets 25 and 26 are made to oppose one another to produce the maximum field intensity at the interior of the magnets. Followers 30 and 31 are preferably low reluctance materials which provide for concentration of the highest field intensities within the magnetic circuit. Translational movement of the actuator causes the magnet followers 30 and 31 to move with the actuator.

In each of the two systems described, the armature or follower is made to have the minimum reluctance possible so that coupling of the maximum magnetic field intensity possible is achieved.

By separating the rotation and translation functions, it is possible to optimize each magnet system for its intended function.

Exterior to the housing, and slidable over the housing is a magnet carriage 4. The magnet carriage is comprised of a housing containing two rectangular magnet pole pieces 23 and their associated rectangular magnets 24a and 24b. In addition, there are two ring magnets 25 and 26 which are located adjacent to, and spaced to engage the ring magnet followers 30 and 31.

Preferably, for maximum performance in terms of coupling of forces through the manipulator, the magnets employed will be of the high-strength rare-earth variety such as samarium-cobalt, or neodymium-iron-boron. Likewise for maximum coupling effectiveness, the magnetic circuit should have the lowest possible reluctance, which requirement dictates that the length of the magnetic path be minimized, and that the material employed have a maximum permeability which is as high as possible for the magnetic field employed.

The force imparted in the rotation of the shaft is enhanced by making the armature and magnet assembly longer, thereby minimizing the reluctance of the magnetic circuit.

These magnetic circuits, in the configuration of the preferred embodiment, produce a linear breakaway force of up to 30 lbs., and a breakaway torque of 12 in.-lbs.

This high magnetic circuit strength also eliminates sloppy sample movement; the magnetic potential of this design allows positioning to within 0.0025 in./lb misalignment force. The design of the magnetic circuit also prevents the accidental decoupling of the magnet from its follower.

To assure fast pumpdown and a low base pressure, good design practice dictates any vacuum mechanism must be constructed of UHV-compatible materials, must be bakeable, and must have no entrapped volumes.

Since the magnets are sintered, they can outgas heavily during a baking cycle and ruin the sensitive optics found in many UHV systems integrity. Accordingly, the magnets are preferably placed outside of the chamber to preserve UHV.

The poles of the magnets 25 and 26 are aligned so that the magnetic fields of the magnet systems oppose one another. Thus magnets 25 and 26 have, e.g., both north poles facing one another. This produces the maximum field intensity at the ring magnet followers 30 and 31, and consequently the maximum coupling of the magnetic field through the ring magnet followers coupling of the magnetic field through the ring magnet followers 30 and 31.

The design of the present invention makes it possible to use a combination of end attachments and rotary mechanisms such as gears, nuts and screws, and cam shafts which would not be possible using the prior art devices. These additions provide added flexibility in some difficult applications.

As one example of the use of independent rotational and linear motion, a polar-coordinate rho-theta stage may be maintained on the actuator end of the manipulator, inside the workspace. In this configuration, the present invention uses rho as translation and theta as rotation, thus allowing an operator to precisely position a sample so that any point on it may be examined.

When used in this configuration, samples are mounted on the edge of a gear-actuated rotary plate the entirety which can be moved linearly over a range of several feet within the vacuum chamber. By suitable choice of linear and rotational motion, every point on a large disk or other large sample can be positioned under an analytical probe. Previously, this would have required a complex rotary mechanism inside the vacuum chamber and operation with external or internal motors.

In a practical realization of the preferred embodiment, the manipulator has yielded a rotary compliance of 2 deg/in.-lb which, when combined with the rho-theta stage, provides an angular accuracy of about 10 min. This high degree of accuracy is important when it is necessary to, for one example, analyze the same sample under various beams, for another example, when it is necessary to locate a defect on a sample using optical microscopy and then to introduce the sample into a vacuum chamber to analyze that same spot.

Although a particular embodiment of the present invention has been described, it will be appreciated by those skilled in the art that variation of the particulars described can be accomplished without departure being made from the scope of the invention as claimed in the following claims, and that each of these variations is expressly contemplated.

What is claimed is:

1. An apparatus for moving or transferring a workpiece within a workspace, which apparatus is operable from a position remote to the workspace, comprising:
   a housing, having a generally cylindrical, hollow form, and having a first end which is open to and communicating with the workspace, and a second end which may be closed;
   a first shaft, having a first end and a second end, and having a plurality of bearing surfaces, parallel to an axis extended from end to end of the shaft, and being at least partially hollow, said first shaft being slidably mounted to the interior of the housing, and having its first end oriented toward the first end of the housing, and having at least one key surface, engaging a matching key on the housing, such that the shaft cannot rotate with respect to the housing;
   a second shaft, rotatably mounted in the hollow portion of the first shaft and having a first end and a second end;
   a first magnetic armature, coupled to the first shaft;
   a first magnetic actuator, cooperating with the first magnetic armature, for coupling translational motion to the first shaft;
   a second magnetic armature, coupled to the second shaft;
   a second magnetic actuator, cooperating with the second magnetic armature, for coupling rotational motion to the second shaft.

* * * * *